(12) United States Patent
Campbell et al.

(10) Patent No.: US 10,041,532 B2
(45) Date of Patent: Aug. 7, 2018

(54) SENSOR DEVICE WITH MOUNTING MEANS

(71) Applicants: Andrew Campbell, East Kilbride (GB); Allan Thomson, Lanark (GB)

(72) Inventors: Andrew Campbell, East Kilbride (GB); Allan Thomson, Lanark (GB)

(73) Assignee: AKTIEBOLAGET SKF, Gothenburg (SE)

( * ) Notice: Subject to any disclaimer, the term of this patent is extended or adjusted under 35 U.S.C. 154(b) by 191 days.

(21) Appl. No.: 14/960,524

(22) Filed: Dec. 7, 2015

(65) Prior Publication Data

US 2016/0169278 A1 Jun. 16, 2016

(30) Foreign Application Priority Data

Dec. 8, 2014 (GB) .................................. 1421781.4

(51) Int. Cl.
| | |
|---|---|
| *F16C 19/52* | (2006.01) |
| *B61F 15/20* | (2006.01) |
| *B60B 27/00* | (2006.01) |
| *G01D 11/02* | (2006.01) |
| *G01D 11/30* | (2006.01) |
| *G01K 1/16* | (2006.01) |
| *B61L 15/00* | (2006.01) |
| *G01D 11/24* | (2006.01) |
| *G01H 1/00* | (2006.01) |
| *G01H 3/00* | (2006.01) |

(52) U.S. Cl.
CPC ............ *F16C 19/527* (2013.01); *B60B 27/00* (2013.01); *B61F 15/20* (2013.01); *B61L 15/0081* (2013.01); *G01D 11/02* (2013.01); *G01D 11/245* (2013.01); *G01D 11/30* (2013.01); *G01K 1/16* (2013.01); *F16C 19/522* (2013.01); *F16C 19/525* (2013.01); *F16C 2326/10* (2013.01); *G01H 1/003* (2013.01); *G01H 3/00* (2013.01)

(58) Field of Classification Search
CPC ...... G01H 1/003; F16C 19/525; F16C 19/527
See application file for complete search history.

(56) References Cited

U.S. PATENT DOCUMENTS

| | | | | |
|---|---|---|---|---|
| 4,347,743 A | * | 9/1982 | Rausche | ................. G01P 15/09 |
| | | | | 73/493 |
| 6,539,800 B2 | * | 4/2003 | Yamashita | .............. G01P 1/026 |
| | | | | 188/73.34 |

FOREIGN PATENT DOCUMENTS

| | | |
|---|---|---|
| CN | 201561978 U | 8/2010 |
| DE | 102008003341 A1 | 7/2009 |
| JP | 2003287436 A | 10/2003 |
| JP | 2008002883 A | 1/2008 |

(Continued)

*Primary Examiner* — John Chapman, Jr.
(74) *Attorney, Agent, or Firm* — Bryan Peckjian; SKF USA Inc. Patent Dept.

(57) ABSTRACT

A sensor device for monitoring a component of interest, including at least one sensor for measuring at least one parameter indicative of condition of the component of interest, signal processing device for processing the signals of the sensor, a housing for at least the signal processing device and a mounting feature for mounting the sensor device close to the component of interest. The mounting feature can include a bolt and bracket having a first portion including an opening for inserting the bolt in an insertion direction and a second portion with a surface parallel to the insertion direction configured to mount the housing.

13 Claims, 9 Drawing Sheets

(56) References Cited

FOREIGN PATENT DOCUMENTS

| | | |
|---|---|---|
| JP | 4760479 B2 | 8/2011 |
| WO | 2007065413 A1 | 6/2007 |

* cited by examiner

SENSOR DEVICE WITH MOUNTING MEANS

CROSS REFERENCE TO RELATED APPLICATION

This is a Non-Provisional Patent Application, filed under the Paris Convention, claiming the benefit of Great Britain (GB) Patent Application Number 1421781.4, filed on 8 Dec. 2014, which is incorporated herein by reference in its entirety.

FIELD OF THE INVENTION

The invention relates to a sensor device for monitoring a mechanical component of interest, in particular a train bearing arranged in a train axle box.

BACKGROUND OF THE INVENTION

The invention relates to devices for monitoring the condition of components, in particular of rotating components of vehicles or machinery. When attempting to monitor the condition, it is often difficult to find suitable locations for the required sensor systems such that they can be applied without disassembly of mechanical systems and resultant destruction of the assemblies and components they are intended to monitor.

Sensor systems should be configured such that they can be quickly and easily installed for a range of condition monitoring tasks. However, increased mounting comfort often leads to an increased distance between the sensor system and the component of interest, such that the quality of the measurement is reduced due to attenuation, increased noise and environmental factors.

Parameters measured in condition monitoring are typically vibration, acoustic emission or temperature. The longer the transmission path for heat or acoustic waves, the higher the risk that information gets lost. Maximizing the transmission of signals of interest to the sensor is a key factor in maximizing the signal-to-noise ratio. As a consequence, it is preferred to place the sensors as close to the component of interest as is practical. In particular, material interfaces and components between the sensors and the component of interest should be minimized, as each interface can add significantly to an attenuation of signals. Further, the sensor system should have a compact design as the space envelope of suitable mounting sites is often small.

SUMMARY OF THE INVENTION

In view of the above considerations, the invention seeks to provide a sensor device for monitoring a component of interest which can be mounted close to the component of interest, requires small space and does not significantly add to the attenuation in a transmission path of physical quantities to be measured between the component of interest and the sensor.

The invention relates to a sensor device for monitoring a component of interest. The sensor device includes at least one sensor for measuring at least one parameter indicative of a condition of the component, signal processing device for processing the signals of the sensor, a housing for receiving and protecting the signal processing device, and a mounting feature for mounting the sensor device to the component of interest.

It is proposed that the mounting feature includes a screw or bolt and a bracket formed as a cast metal part, wherein the bracket has a first portion including an opening for inserting the screw or bolt in an insertion direction and a second portion parallel to the insertion direction, wherein the second portion has a surface configured to mount the housing and/or the sensor. The first portion of the bracket has an end face configured to be pressed directly against a surface of the component of interest by the clamping force generated by the bolt and the second portion protrudes away from the end face.

The bracket of the sensor device according to the invention ensures that the sensors can be aligned for optimal detection. The second portion of the bracket arranged upright is configured for mounting the sensors and preferably has a flat surface. The coupling of acoustic emission and vibrations is of high quality because acoustic waves entering the bracket via the first portion can be securely guided to the second portion and the sensor. The angled arrangement of the two portions leads to a compact design while at the same time allowing for the insertion of a screw or bolt and fixing tools to tighten the screw or bolt even within very restricted space limits.

In preferred embodiments of the invention, the sensor is formed as a vibration sensor, an acoustic emission sensor and/or as a temperature sensor. In either case, a substance for improving the transmission of acoustic waves between the component of interest and the sensor can be used at an interface between the bracket and the component on which the bracket is mounted, wherein the substance may be a gel or a paste.

Preferably, the sensors are placed as close as possible to the base portion of the bracket in order to minimize the influence of external noise.

Further, it is proposed that the sensor device comprises at least one battery for powering the signal processing device and/or the sensor. In alternative embodiments of the invention, the sensor device can be equipped with a generator assembly such as a thermal generator or a power harvester.

In a preferred embodiment of the invention, the sensor device comprises a transmitter for wireless communication. This facilitates the use in retrofit applications, because the installation of wires or cables can be avoided. An antenna of the transmitter can be arranged in a protected space if the housing is made of a material permitting the transmission of electromagnetic waves emitted and/or intended to be received by the transmitter.

In a preferred embodiment of the invention, the component of interest is a bearing of a vehicle, in particular a bearing in a train axle hub. Preferably, the sensor device is configured to be attached close to a loaded zone of a non-rotating ring of a bearing. The inventors have found that there is a statistically better chance of detecting high-frequency vibrations from a bearing, if the sensor is located in the area relatively close to the loaded zone of the bearing and/or approximately in line with the load direction. In the case of a vehicle, such as a train, the load line travels vertically upwards, passing through the center of the bearing. It has been found that placing sensors within +30 degrees of the load line facilitates good signal detection of high-frequency vibrations. Further, it is proposed that the sensor is oriented with regard to the line of maximum stress in order to further improve the signal detection quality. The performance of vibration and acoustic emission sensors has been found to give best performance when the sensors are mounted on the line of maximum stress +25 degrees. These parameters apply in particular to sensor devices designed for application to monitoring train axle boxes.

Further, it is proposed that the sensor device is configured to be located in a direction of highest stiffness of the system. This direction is likely to ensure a reliable transmission of acoustic waves.

Further, it is proposed that at least the second portion of the bracket comprises a structure, such as flanges or ridges, increasing the rigidity of the second portion.

In preferred embodiments of the invention, the bracket is a cast metal part, in particular made of Zamak 5 alloy, which is an alloy as defined in the standard EN12844 with a base metal of zinc and alloying elements of aluminum, magnesium and copper. Zamak alloys are part of the zinc aluminum alloy family, wherein they are distinguished from the other ZA alloys because of their constant aluminum content of 4%. However, other materials with high rigidity can be suitable for the bracket as well. In general, it is important that the material passes vibrations, acoustic emissions and temperature, and does not block or strongly attenuate these quantities.

Further, it is proposed to provide the surface of the mounting bracket which is configured to contact the sensor in the form of a flat surface, preferably a polished surface optionally equipped with a gel for improving the acoustic coupling and/or a thermally conductive paste.

Further, it is proposed that a signal processing device is formed as a PCB which is potted or overmoulded in order to protect the electronics from vibration, temperature, fire, foreign object strike corrosion, etc. The electronic parts should fulfil the standards set, e.g., in EN50155 and EN61373.

The above embodiments of the invention as well as the appended claims and figures show multiple characterizing features of the invention in specific combinations. The skilled person will easily be able to consider further combinations or sub-combinations of these features in order to adapt the invention as defined in the claims to his specific needs.

DETAILED DESCRIPTION OF THE EMBODIMENTS

Figure 1:
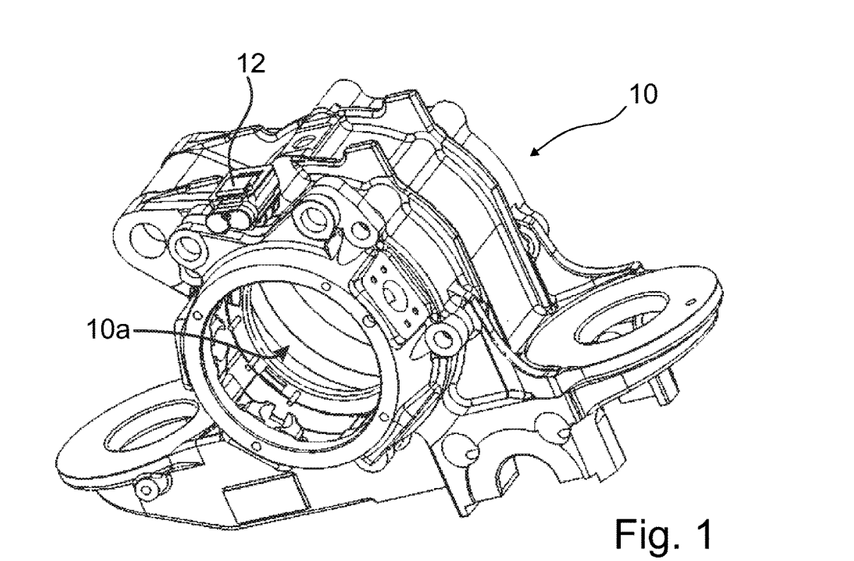
FIG. 1 illustrates an axle box equipped with a sensor device according to the invention.

FIG. 1 illustrates an axle box 10 for a passenger train comprising a central bore 10a for receiving a double-row roller bearing (not shown). A sensor device 12 according to the invention is attached to a flange in a top part of the axle box 10.

Figure 2:
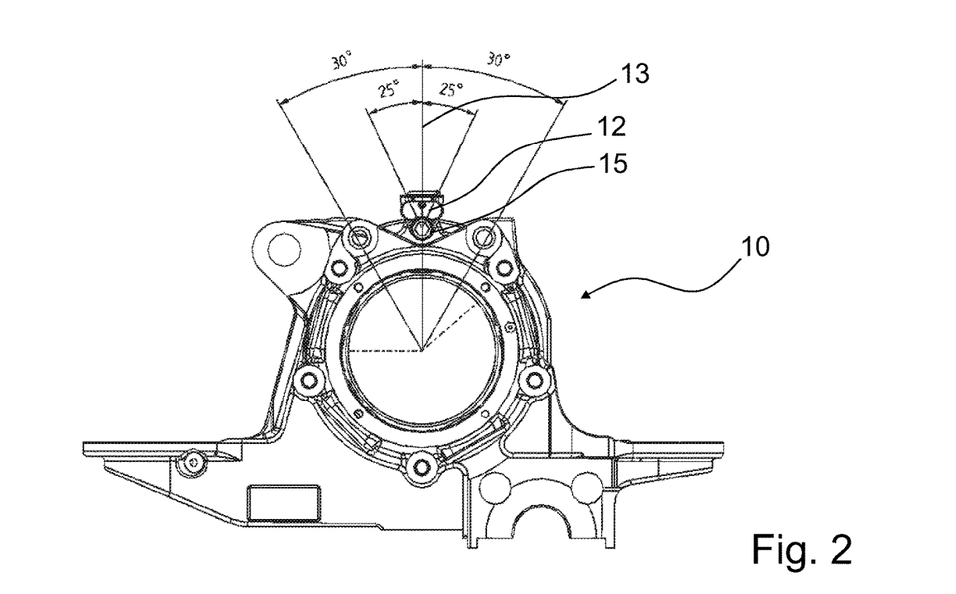
FIG. 2 is an axial view of the axle box according to FIG. 1.

As illustrated in FIG. 2, the sensor device 12 is attached directly in the line of load 13 of the axle box 10 and of the bearing mounted therein such that the sensor device 12 is located very close to a loaded zone of the bearing in a direction of maximum stiffness of the axle box 10. The sensor device includes a bolt 15 for fastening a body part of the sensor device 12 to the axle box. The mounting position maximizes the transmission of high frequency noise as generated e.g. by defects of the rolling elements passing by the sensor device 12.

Figure 3:
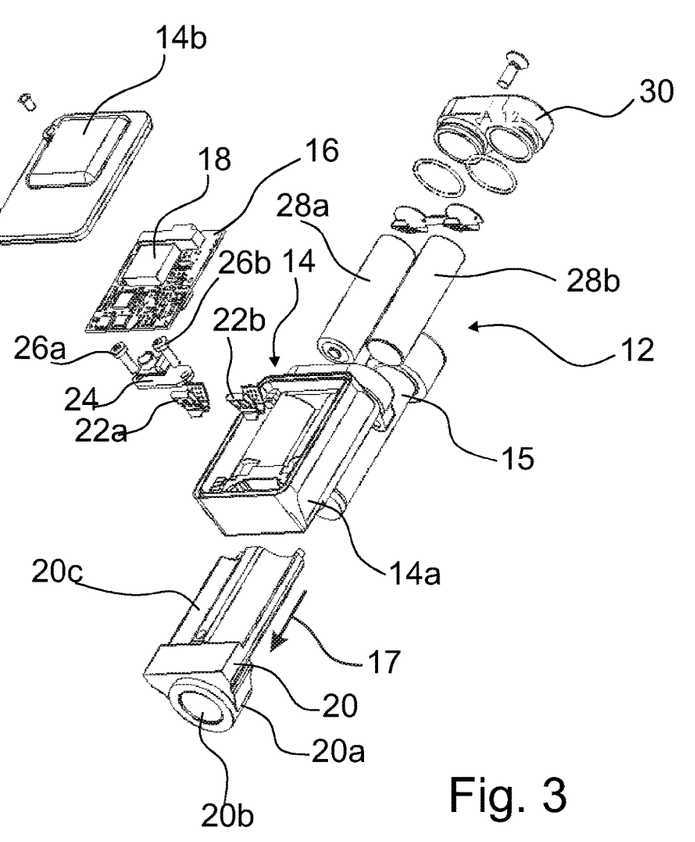
FIG. 3 is an exploded view of a sensor device according to a first embodiment of the invention.

FIG. 3 is an exploded view of the sensor device 12 according to the invention. The sensor device 12 comprises a housing 14 having a lower housing part 14a and a housing cover part 14b, both made of dielectric plastic material. The housing 14 is provided with a gasket (not shown) or with multiple gaskets in order to protect the electronics arranged therein.

The sensor device 12 includes a PCB with various electronic components as a signal processing device 16. In particular, the signal processing device includes a wireless transmitter 18, the antenna of which is arranged under a protruding portion of the housing cover member 14b such that signals sent by the transmitter and/or received by the transmitter are unaffected by the metallic parts of the axle box 10 and of the sensor device 12.

Further, the sensor device 12 includes a bracket 20 as a mounting feature with a roughly angular shape, the bracket 20 having a first portion 20a with an opening 20b for receiving the bolt 15 and a second portion 20c extending perpendicular to the first portion 20a of the bracket 20. The opening 20b is configured such that the bolt 15 can be fitted into the opening 20b in an insertion direction 17. The second portion 20c has a surface extending parallel to the insertion direction 17 and the housing is mounted on the surface using screws.

Sensors 22a, 22b formed as temperature and acoustic emission sensors are attached to the signal processing device 16 via a flexible circuit board, and are directly attached to or embedded into a solid base part of the bracket 20 connecting the portions 20a, 20c. The sensors 22a, 22b are fixed on the bracket by a mounting plate and screws 26a, 26b. Electronic devices such as capacitors for filtering or damping the sensor signals are mounted on the mounting plate as a part of a sensor unit including the sensors 22a, 22b.

Further, the sensor device 12 includes batteries 28a, 28b and a cover member 30 of a battery compartment as well as suitable electrodes and gasket rings for sealing the battery compartment.

The printed circuit board forming the signal processing device 16 is potted on both sides.

As illustrated in FIG. 3, the second portion 20c of the bracket 20 is provided with stabilizing ridges following the shape of the batteries 28a, 28b, which increase the rigidity of the bracket. The bracket is a solid cast metal part made of Zamak 5 alloy.

The sensors 22a, 22b can be attached to a flat and/or polished portion of the surface of the bracket 20 and/or fitted into a recess machined into the material of the bracket 20. The location at which the sensors 22a, 22b are attached to the bracket 20 should be as close as possible to the lower surface of the first part 20a of the bracket facing the axle box 10 and the bearing as the component to be monitored. In the embodiment illustrated in FIGS. 4 and 5, the sensors 22a, 22b are arranged axially between the head of the bolt 15 and the axle box 10.

Figure 4:
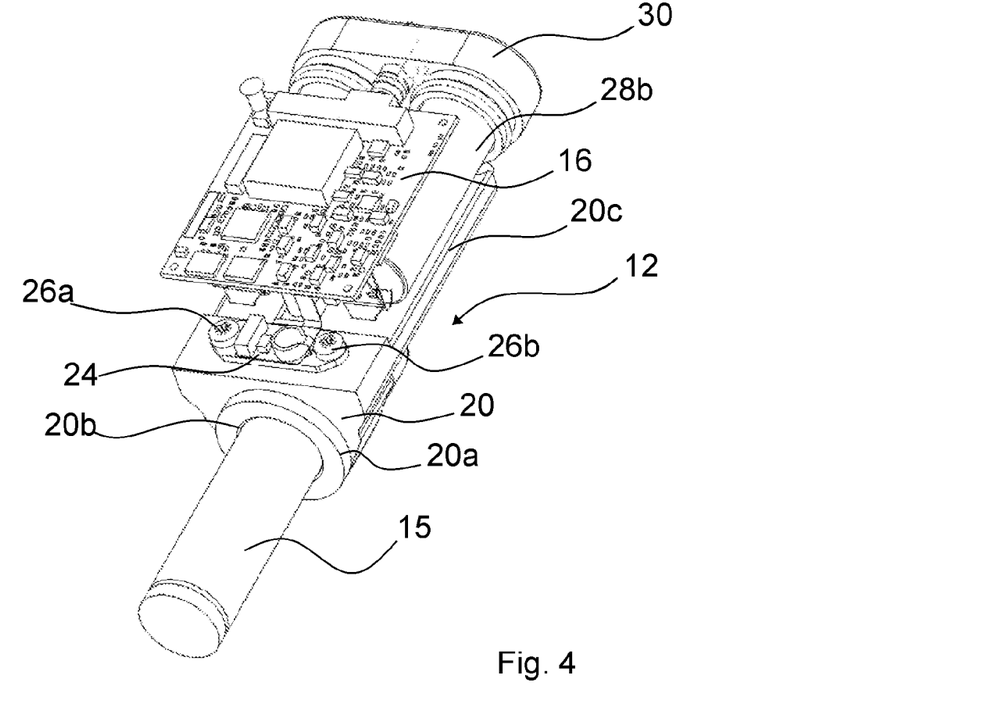
FIG. 4 is a further exploded view of the sensor device according to the first embodiment of the invention.

FIG. 4 illustrates the assembly with the housing parts 14a, 14b removed.

Figure 5:
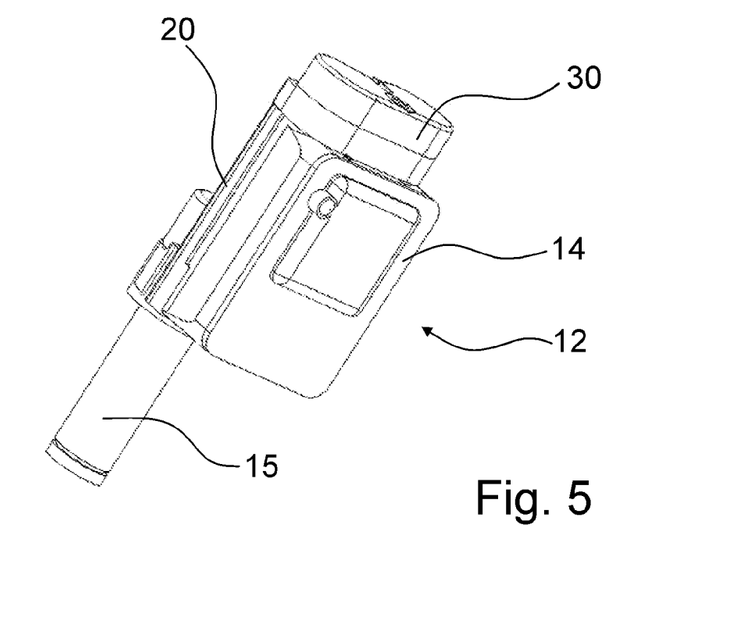
FIG. 5 is a first perspective view of the sensor device according to the first embodiment of the invention in an assembled configuration.
Figure 6:
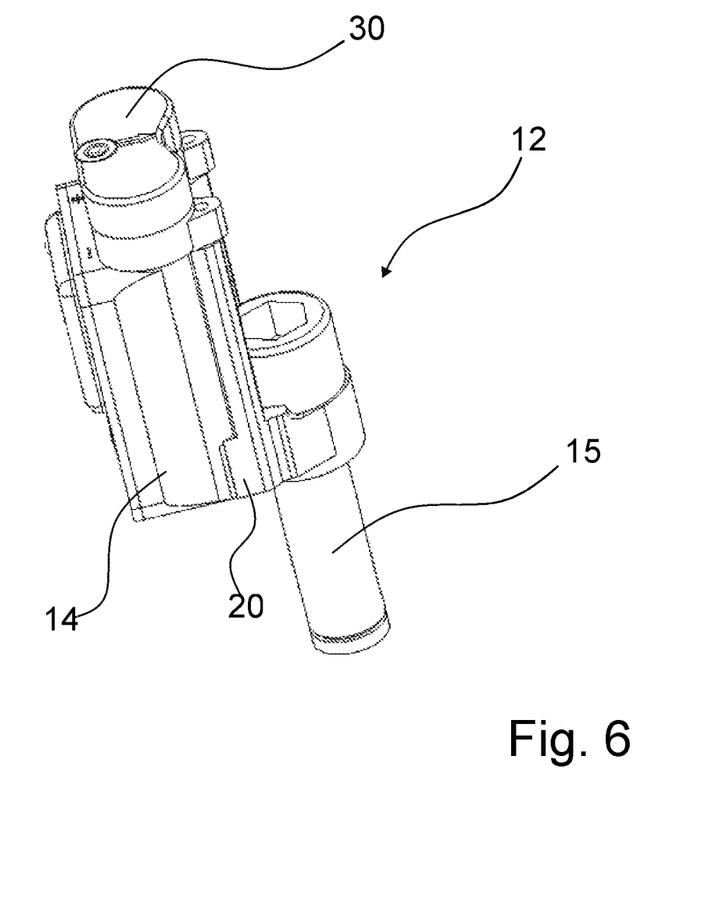
FIG. 6 is a second perspective view of the sensor device according to the first embodiment of the invention.

FIGS. 5 and 6 show the sensor device 12 in different perspective views.

Further embodiments of the invention are illustrated in FIGS. 7 to 11. The following description of the further embodiments is limited to differences to the embodiment illustrated in FIGS. 1 to 6 in order to avoid repetitions. For features which are unchanged the reader is referred to the above description of the embodiment of FIGS. 1 to 6. Similar features are provided with the same reference numbers in order to highlight the similarities.

Figure 7:
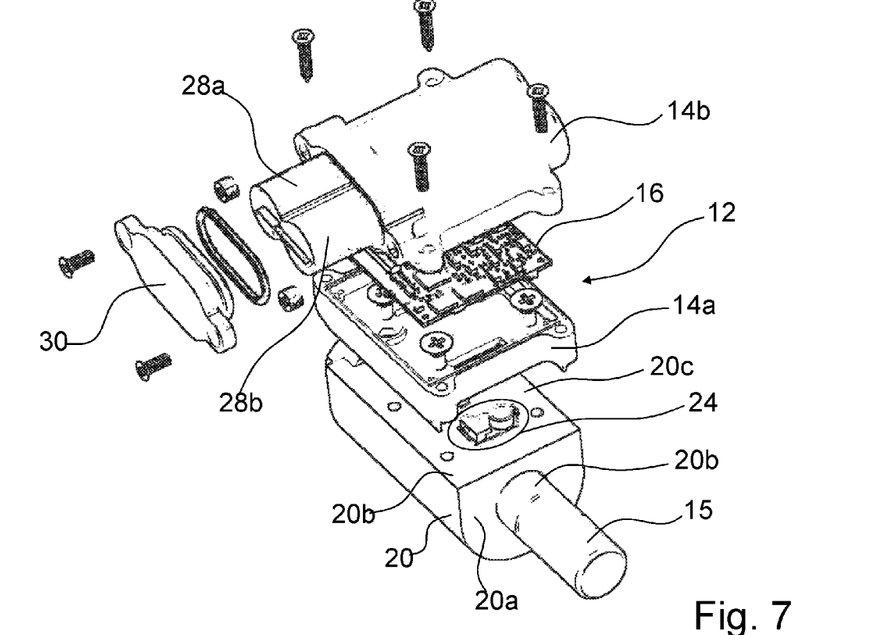
FIG. 7 is an exploded view of the sensor device according to a second embodiment of the invention.
Figure 8:
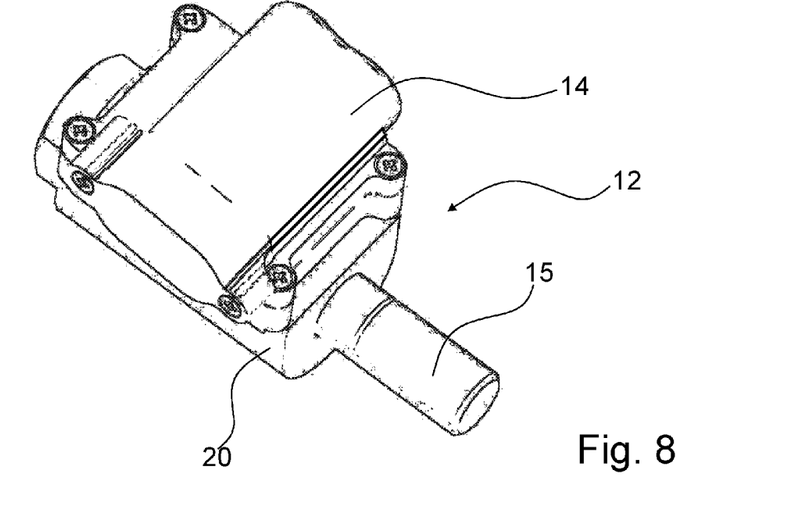
FIG. 8 is a sensor device according to the second embodiment of the invention in an assembled configuration.

In the embodiment of FIGS. 7-8, the bracket 20 is formed as a sleeve-like body with an opening 20b formed as an axial bore and a flat side face 20d with smaller bores for mounting the housing 14 using screw. A sensor unit 24 is embedded in a recess in the side face 20d and the sensing surfaces of the sensors 22a, 22b are contact with an inner surface of the recess, wherein the inner surface extends in a direction perpendicular to the axial direction of a bolt 15 for fastening the sensor device 12.

The orientation of the battery compartment or power pack of the sensor device 12 in the embodiment of FIG. 7 is rotated by 90° as compared to the embodiment of FIGS. 1 and 2. Further, the battery compartment is arranged on top of the signal processing device 16. The more massive bracket 20 in the embodiment of FIG. 7 ensures a transmission of vibrations and heat transfer with low loss. The bolt 15, which is a standard M16 bolt, has to be about 40 mm longer than in the embodiment of FIGS. 1-6.

Figure 9:
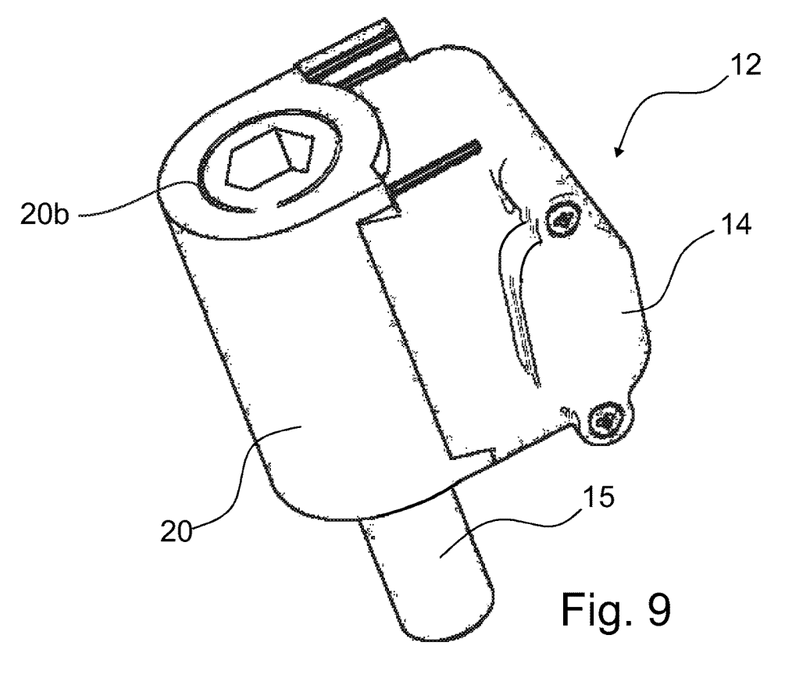
FIG. 9 is a perspective view of a sensor device according to a third embodiment of the invention.

In the embodiment of FIG. 9, the bracket 20 is formed as a sleeve-like body with an opening 20b formed as an axial bore, wherein an end of the bore remote from the side of the component to be monitored has an increased diameter in order to countersink the head of the bolt 15.

Figure 10:
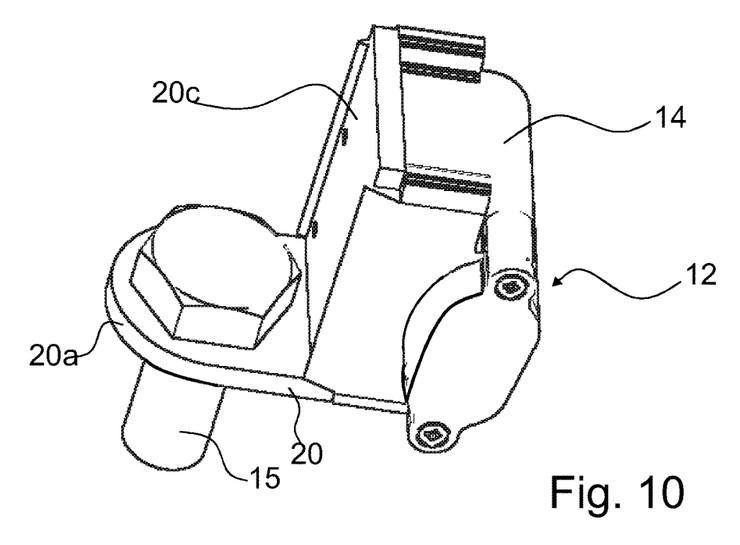
FIG. 10 is a perspective view of a sensor device according to a fourth embodiment of the invention.
Figure 11:
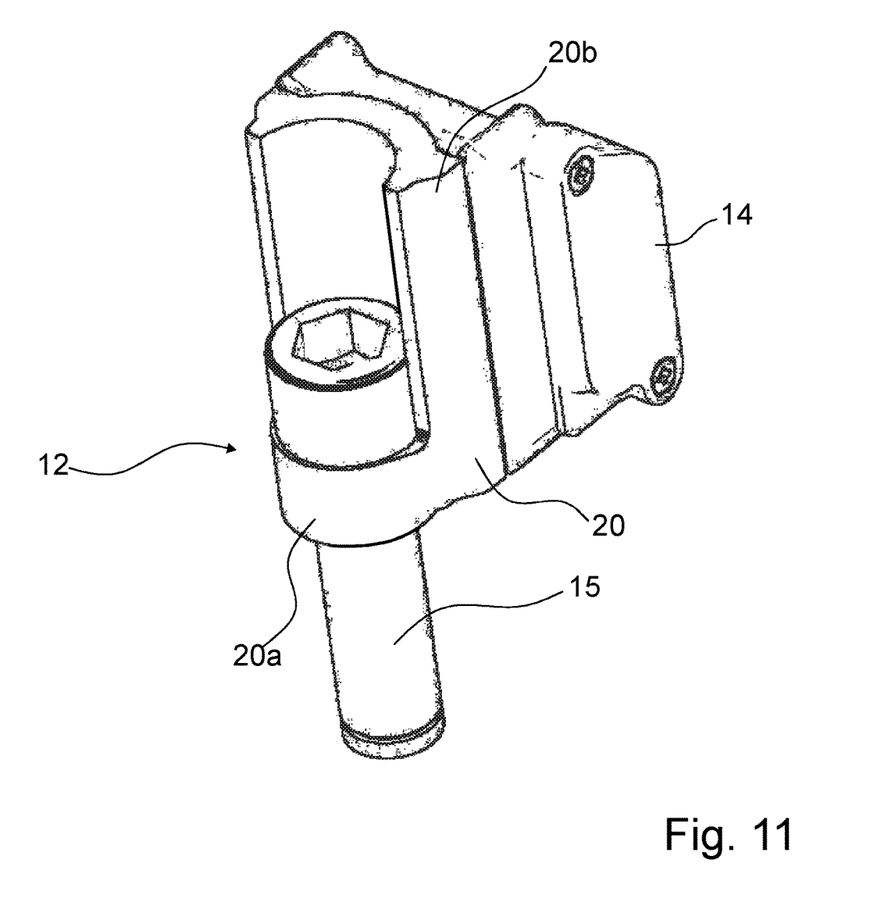
FIG. 11 is a perspective view of a sensor device according to a fifth embodiment of the invention.

The embodiment of FIG. 10 features a generally L-shaped bracket with an angular shape for fixing the sensor device 12 to the axlebox.

In the embodiment of FIG. 10, the bracket 20 of the sensor unit 12 includes an inner surface with a roughly semicircular profile encompassing a screw head of the bolt 15. The lateral edges of the semicircular profile are formed as ridges increasing the rigidity of the bracket 20.

Figure 12:
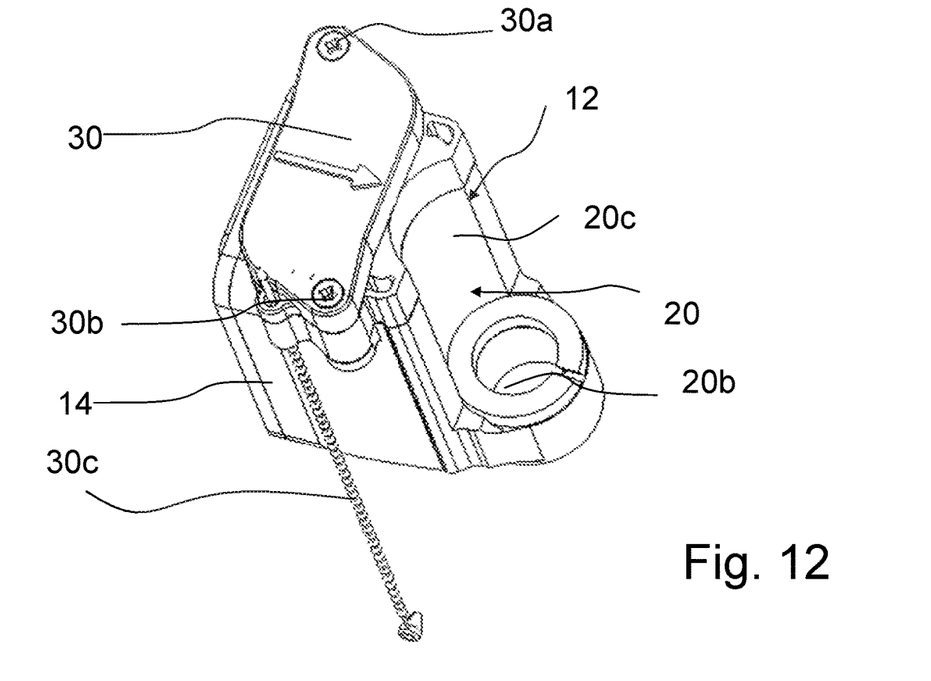
FIG. 12 is a perspective view of a sensor device according to a sixth embodiment of the invention.
Figure 13:
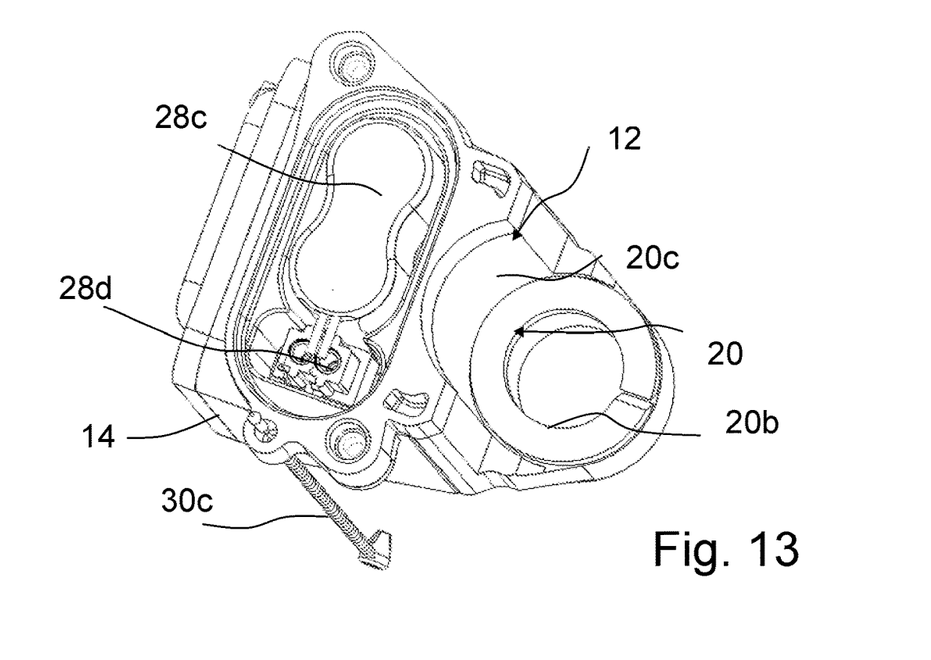
FIG. 13 is a perspective view of the sensor device according to the sixth embodiment of the invention with a battery cover removed.
Figure 14:
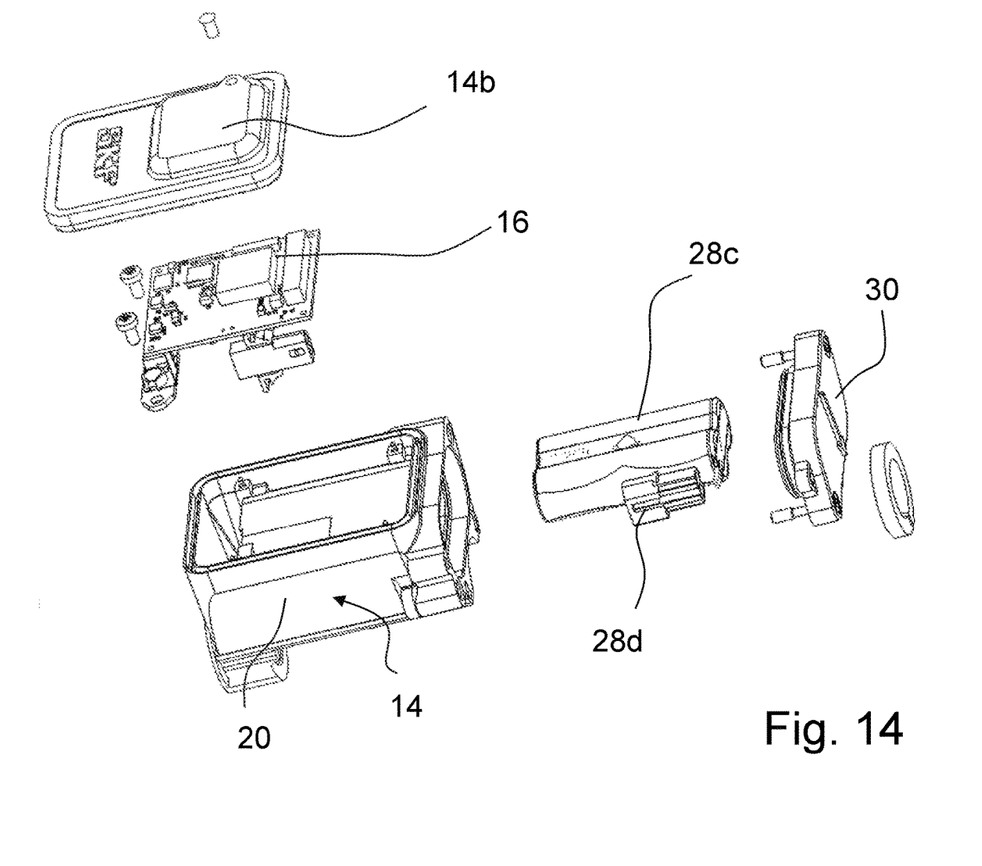
FIG. 14 is an explosion view of the sensor device according to the sixth embodiment of the invention.

FIGS. 12 to 14 are views of a sensor device according to a sixth embodiment of the invention. Instead of using batteries witch clips a battery pack 28c with a connector 28d is used. The battery pack 28 is arranged in a space provided between a PCB as the signal processing means 16 and a body part as the second portion 20G of the bracket 20. The battery cover 30 is fixed by two screws 30a, 30b and kept assembled to a housing 14 of the device by a cable tie 30c.

Further embodiments of the invention include spacers to be arranged between the bracket 20 and the axlebox 10.

What is claimed is:

1. A sensor device for monitoring a component of interest, including:
   a housing;
   at least one sensor for measuring at least one parameter indicative of a condition of the component of interest;
   a signal processing device for processing the signals of the sensor, each at least one sensor being in signal communication with the signal processing device, wherein the signal processing device is completely encased within the housing; and
   a mounting feature for mounting the sensor device close to the component of interest,
   the mounting feature includes a bolt and a bracket formed as a cast metal part,
   the bracket having a first portion including a solid base part defining an opening for inserting the bolt in an insertion direction and an end face configured to be pressed directly against a surface of the component of interest by the clamping force generated by the bolt and a second portion with a surface parallel to the insertion direction configured to mount the housing,
   each at least one sensor being one of:
      (a) directly attached to the solid base part of the bracket, or
      (b) embedded into the solid base part of the bracket;
   wherein the second portion protrudes away from the end face.

2. The sensor device according to claim 1, wherein each sensor of the at least one sensor is selected from a group of sensors, the group of sensors consisting of:
   (a) a vibration sensor,
   (b) an acoustic emission sensor, and
   (c) a temperature sensor.

3. The sensor device according to claim 1, further comprising at least one battery for powering the signal processing device.

4. The sensor device according to claim 1, further comprising a transmitter for wireless communication.

5. The sensor device according to claim 4, wherein the housing is made of a material permitting the transmission of electromagnetic waves, the electromagnetic waves being at least one of:
   (a) emitted by the transmitter, and
   (b) intended to be received by the transmitter.

6. The sensor device according to claim 1, wherein the component of interest is one of:
   a bearing of a vehicle or
   a housing of a bearing of a vehicle,
   wherein the sensor device is configured to be attached close to a loaded zone of a non-rotating ring of the bearing.

7. The sensor device according to claim 6, wherein the sensor device is configured to be attached within +/−30 degrees of a load line with regard to a rotation axis of the bearing,
   wherein the load line is defined as a straight line passing the rotation axis of the bearing in a direction where an operational load on the bearing is maximum.

8. The sensor device according to claim 1, wherein the sensor device is configured to be attached to an axlebox of a train.

9. The sensor device according to claim 1, at least the second portion of the bracket further comprising a structure increasing the rigidity thereof.

10. The sensor device according to claim 1, wherein the bracket is made of a Zamak 5 alloy.

11. The sensor device according to claim 1, further comprising a substance improving the transmission of the parameter to be measured,
 wherein the substance is provided at an interface between the sensor and the bracket.

12. The sensor device according to claim 1, wherein a surface of the mounting bracket which is in contact with the sensor is formed as a flat surface.

13. The sensor device according to claim 1, the housing comprising a housing body and a housing cover, the housing cover detachably assembled to the housing body.

* * * * *